United States Patent [19]
Geiermann et al.

[11] Patent Number: 6,037,558
[45] Date of Patent: Mar. 14, 2000

[54] INTEGRATED LOW INERTIA PROJECTION WELDING HEAD AND CYLINDER

[75] Inventors: Thomas J. Geiermann, Bay City; Barry Borsenik, Brant, both of Mich.

[73] Assignee: Newcor, Inc., Bloomfield Hills, Mich.

[21] Appl. No.: 09/106,952

[22] Filed: Jun. 30, 1998

[51] Int. Cl.[7] .................................................. B23K 11/31
[52] U.S. Cl. .................................... 219/86.33; 219/86.25; 219/93
[58] Field of Search ............................ 219/86.25, 86.33, 219/86.7, 86.9, 89, 93

[56] References Cited

U.S. PATENT DOCUMENTS

| | | |
|---|---|---|
| 454,698 | 6/1891 | Angell . |
| 1,760,155 | 5/1930 | MacDonald et al. . |
| 1,787,115 | 12/1930 | Lewis . |
| 2,255,652 | 9/1941 | Dawson et al. . |
| 2,569,968 | 10/1951 | Autie et al. ....................... 219/86.33 X |
| 3,114,034 | 12/1963 | Breuer et al. . |
| 3,238,352 | 3/1966 | Kollmann et al. ............... 219/86.25 X |
| 3,308,262 | 3/1967 | Fisher et al. . |
| 3,398,255 | 8/1968 | Aldenhoff . |
| 3,445,620 | 5/1969 | Littwin et al. . |
| 3,509,306 | 4/1970 | Merchant . |
| 3,509,315 | 4/1970 | Breuer et al. . |
| 3,632,958 | 1/1972 | Width . |
| 3,737,618 | 6/1973 | Arnosky . |
| 4,282,417 | 8/1981 | Jurek . |
| 4,417,122 | 11/1983 | Thorne . |
| 4,762,976 | 8/1988 | Miller et al. . |
| 4,803,325 | 2/1989 | Frei et al. . |
| 4,831,228 | 5/1989 | Schumacher . |
| 5,131,581 | 7/1992 | Geiermann . |
| 5,277,353 | 1/1994 | Budig et al. . |
| 5,420,389 | 5/1995 | Davies . |
| 5,714,730 | 2/1998 | Geiermann et al. .................. 219/86.25 |
| 5,744,773 | 4/1998 | VanOtteren et al. . |

FOREIGN PATENT DOCUMENTS

| | | |
|---|---|---|
| 1 565 447 | 9/1970 | Germany . |
| 3618054 | 12/1986 | Germany .................................. 219/89 |
| 61-293680 | 12/1986 | Japan .................................. 219/86.33 |
| 2-207975 | 8/1990 | Japan . |
| 397 894 | 8/1965 | Switzerland . |
| 120 880 | 1/1959 | U.S.S.R. . |
| 860 855 | 2/1961 | United Kingdom . |
| 957820 | 5/1964 | United Kingdom .................. 219/86.9 |
| 1 207 696 | 10/1970 | United Kingdom . |

OTHER PUBLICATIONS

Brochure entitled "HY–PAK™ Solutions", Newcor, Bay City Division, Apr. 1991, (6 pages), and "Hy–Pak Welding" enclosure sheets (29 pages).

"Solutions Through Proprietary Welding Technology", Innovative Manufacturing Systems, Apr. 1991, (4 pages).

"Stamping the Ram", by Lindsay Brooke, Reprinted from Automotive Industries Sep. 1993 issue, Furnished by Bay City Division, Newcor, Inc. (2 pages).

Materials Joining Tech Briefs, Brief #2, Body Materials Engineering, Sep. 1994, published by Materials Engineering's Materials Joining Laboratory (2 pages).

Materials Joining Tech Briefs, Brief #3, Body Materials Engineering, Oct. 1994, published by Materials Engineering's Materials Joining Laboratory (2 pages).

Materials Joining Tech Briefs, Brief #4, Body Materials Engineering, Nov. 1994, published by Materials Engineering's Materials Joining Laboratory (2 pages).

*Primary Examiner*—Gregory Mills
*Attorney, Agent, or Firm*—Flynn, Thiel, Boutell & Tanis, P.C.

[57] ABSTRACT

An integrated projection welding head and drive assembly which has a pressure drive device moving an electrode head assembly into contact with one of the workpieces projection weld two workpieces together. A force generation unit biasing the electrode assembly outwardly of the drive device is housed in the drive device.

17 Claims, 8 Drawing Sheets

INTEGRATED LOW INERTIA PROJECTION WELDING HEAD AND CYLINDER

FIELD OF THE INVENTION

This invention relates to a projection welding arrangement and, more specifically, to an improved welding assembly including an integrated low inertia projection head and cylinder.

BACKGROUND OF THE INVENTION

Projection welding is a known technique for permitting a weld-type securement between two thin overlapping metal sheets. One of the sheets is provided with a small projection extending transversely therefrom with the tip of the projection being maintained in contact with the other overlapping sheet. The electrode of a welding gun is normally pressed into contact with the other sheet, generally in alignment with the projection. A combination of force and electric current is then applied to the electrode to effect welding together of the two sheets at the contact area defined by the projection, and to collapse the projection to effect a weld nugget for securing the overlapping sheets together. Conventional projection welding technique applies alternating electrical current to the contact electrode over a relatively long time period, whereby several cycles of AC current are applied to the electrode to permit performance of a single projection weld. The long current application time and the difficulty in achieving the desired contact force and collapsing of the heated projection have often resulted in disadvantages which have made projection welding less desired for use on thin gauge metal sheets. For these and other reasons, projection welding has previously not met with a high level of acceptance for use on thin metal sheets, although more recently a greater acceptance is being achieved.

Figure 8:
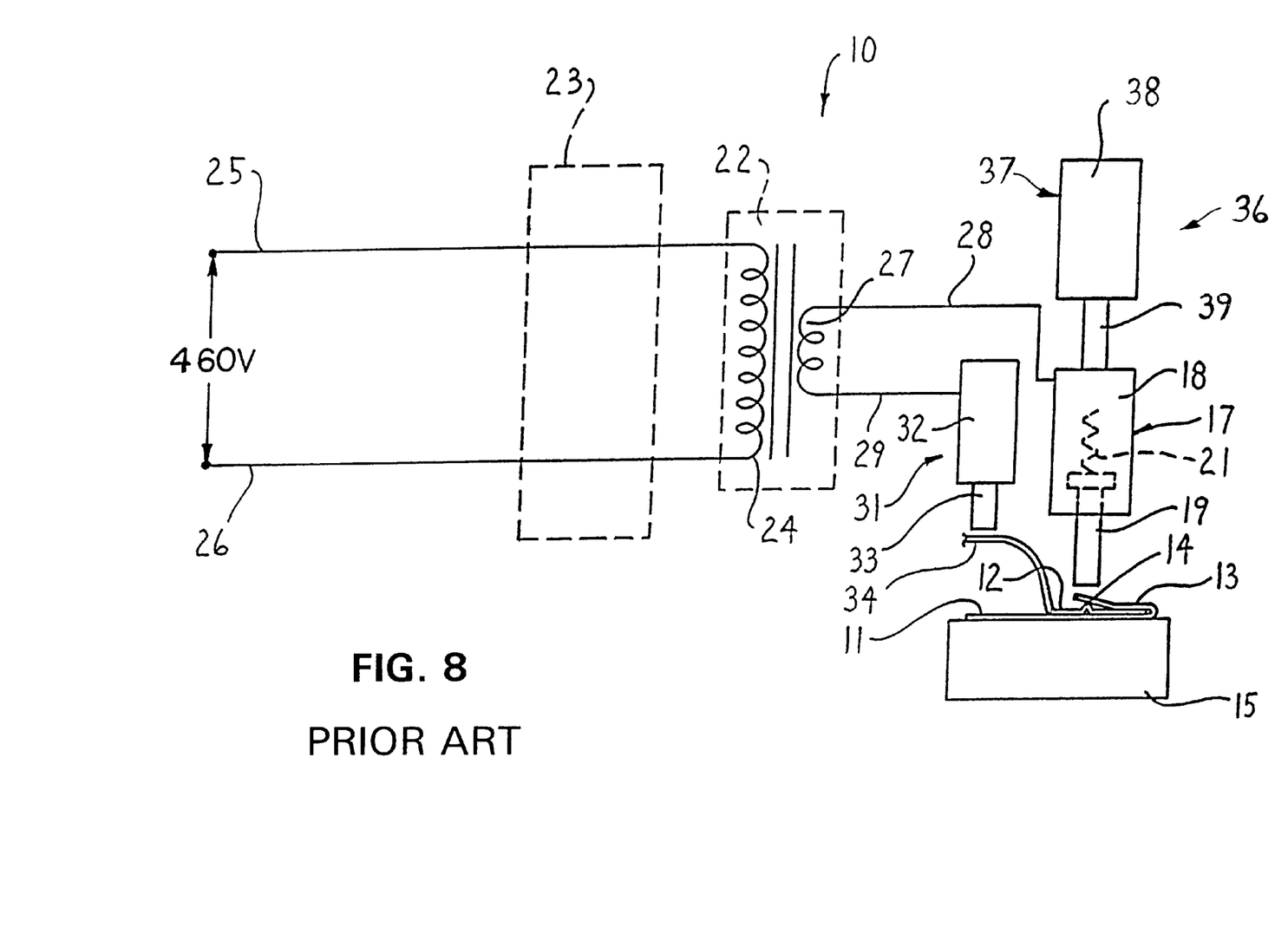
FIG. 8 is a schematic view of a prior projection welding arrangement.

To further explain conventional projection welding systems, there is illustrated in FIG. 8 a known system 10 for effecting projection welding. This welding system 10 is particularly desirable for projection welding of thin sheet-like metal components disposed in overlapping relation, typically light-gauge metal sheets which commonly have a thickness in the range of about 0.020 to about 0.050 inch. The thin sheets as illustrated at 11 and 12 have portions which directly overlap, and in a hem welding process one of the sheets 11 has a flange or hem part 13 which is bent upwardly to overlap a side of the other sheet 12. The sheet 12 is sandwiched between the sheet 11 and its hem part 13. Intermediate sheet 12 has a bead or projection 14 projecting transversely therefrom so that the tip of the projection contacts the adjacent surface of the hem part 13. A projection weld is created directly between the sheet 12 and the hem part 13 at the region of the projection 14.

In the projection welding system 10 as shown in FIG. 8, the overlapping sheets 11, 12 are typically positioned on a support or die 15, and a movable welding held assembly 17 is positioned adjacent the die 15 to effect creation of the projection weld between the overlapped sheets. The welding head assembly 17 includes a hollow housing or body 18 having an electrode 19 movably supported therein and projecting outwardly for contact with the overlapped sheets in the region of the projection, and a spring 21 is confined within the housing 18 and acts against an inner face of the electrode 19 so as to urge the electrode outwardly into an extended position, in which position the electrode abuts an interior stop surface formed on the housing. The welding head assembly 17 is electrically connected to a stationary transformer 22. The power supply to the transformer 22, and hence the welding current supplied to the welding head assembly, is controlled by a suitable control unit 23. The transformer 22 has the primary coils 24 thereof connected to suitable electrical conductors 25 and 26 that supply electrical energy to the welding system 10. The secondary coils 27 of the transformer are in turn connected to electrical conductors 28 and 29, one of which is connected to the welding head assembly 17 and the other is connected to the workpieces 11, 12, such as being connected either to the die 15 or to an electrical contact gun 31. The contact gun 31 includes a support 32 such as a conventional double-acting pressure cylinder, normally an air cylinder, having a conventional electrode 33 movably supported thereon. The electrode 33 engages a part 34 of the intermediate sheet 12, which part 34 is spaced from the overlapping portions of the sheets. The conductors 28 and 29 are typically constructed of a conventional flexible lamination so as to permit respective movement of the welding head assembly 17 and contact assembly 31 relative to transformer 22.

The welding head arrangement also includes a drive device 36 for effecting movement of the welding head assembly 17. The drive device conventionally comprises a pneumatic cylinder 37 having a housing 38, which is typically stationarily mounted spaced and separate from the welding head assembly 17. An extendible and contractible piston rod 39 extends from the housing 38 and couples the housing 18 of the welding head assembly 17 to the drive device 36. The piston rod 56 controls the movement of the assembly 17 into engagement with the sheets 11, 12 when a projection welding operation is carried out.

U.S. Pat. Nos. 4,417,122 and 5,714,730, both owned by the Assignee hereof, relate to improved projection welding arrangements which overcome some of the prior difficulties in projection welding light-gauge metal sheets. The '122 and '730 patents are herein incorporated by reference. Brief descriptions of the '122 and '730 patents are provided for convenience.

The system of the '122 patent relates to a welding gun having a lower inertia and hence fast response electrode receiving an extremely short duration electrical current, which duration is typically only a fraction of one-half of the alternating current wave cycle. A high energy, short duration pulse of current is transmitted to the moving welding head and applied to the projection contact area between the overlapping sheets to effect rapid and efficient welding of the sheets together.

The arrangement of the '730 patent is related to precalibrating a welding gun in the welding arrangement so that an electrode of the welding gun applies a force having substantially a predetermined magnitude against one sheet when creating the projection weld. The '730 welding head assembly is slidably mounted to a fixed frame and is activated by a drive cylinder mounted separate from the head assembly. The drive cylinder has an outwardly projecting rod that connects to the welding head assembly whereby the welding head assembly, including the calibration spring structure, is spaced from the drive cylinder. The piston rod facilitates movement of the welding head assembly for performing the projection weld. The precalibration of the electrode is permitted by pretensioning the spring, as housed in the welding assembly, against which the electrode is positioned. The spring yields to the driving force of the drive cylinder once the electrode contacts a workpiece and is further compressed. Once the drive cylinder extends the rod a predetermined amount, the spring force is precalibrated by adjusting a spring support surface to yield the desired force for performing the projection weld.

While projection welding and particularly hem-type projection welding using the aforementioned welding heads has proven fairly successful and is gaining commercial acceptability, nevertheless there still exists room for improvement. For example, with this type of welding head, it is still desired to reduce the linear size and integrate components to reduce the size and weight of the welding assembly making it easier to integrate into automated systems. Further, it is desired to reduce the mass of the components that move during the weld thereby reducing the inertia of the device to correspondingly reduce the required driving force so that the welding head has an efficient and rapid response time.

It is an object of this invention to provide an improved projection welding arrangement, which is believed to represent an improvement over the prior arrangements.

More specifically, in the improved welding arrangement of this invention, the welding head has a drive cylinder for axially moving the electrode assembly to transversely contact the workpiece. A piston rod extends from the cylinder and has an axial bore therein receiving a force generation unit therein, which imparts motion to a coaxial shaft slidably mounted in the rod bore and extends therefrom. The extension of the shaft mounts an electrode assembly thereon. An adjustable end assembly is selectively movably mounted in an open end of the rod bore and has an opening through which the shaft extends. The position of the end assembly in the rod bore preloads the spring to select a spring force.

In the illustrated embodiment, the force generation unit includes a preloadable, axially acting spring that is preloaded by selectively compressing the spring between two support surfaces and adjusting one of the support surfaces by positioning the end assembly in the rod bore.

Other objects and purposes of the invention will be apparent to person familiar with structures and processes of this general type upon reading the following description and inspecting the accompanying drawings.

Certain terminology will be used in the following description for convenience in reference only, and will not be limiting unless specifically stated. For example, the words "upwardly", "downwardly", "rightwardly" and "leftwardly" will refer to directions in the drawing to which reference is made. The words "inwardly" and "outwardly" will refer to directions toward and away from, respectively, the geometric center of the arrangement and designated parts thereof. Said terminology will include the words specifically mentioned, derivatives thereof, and words of similar meaning.

DETAILED DESCRIPTION

Figure 1:
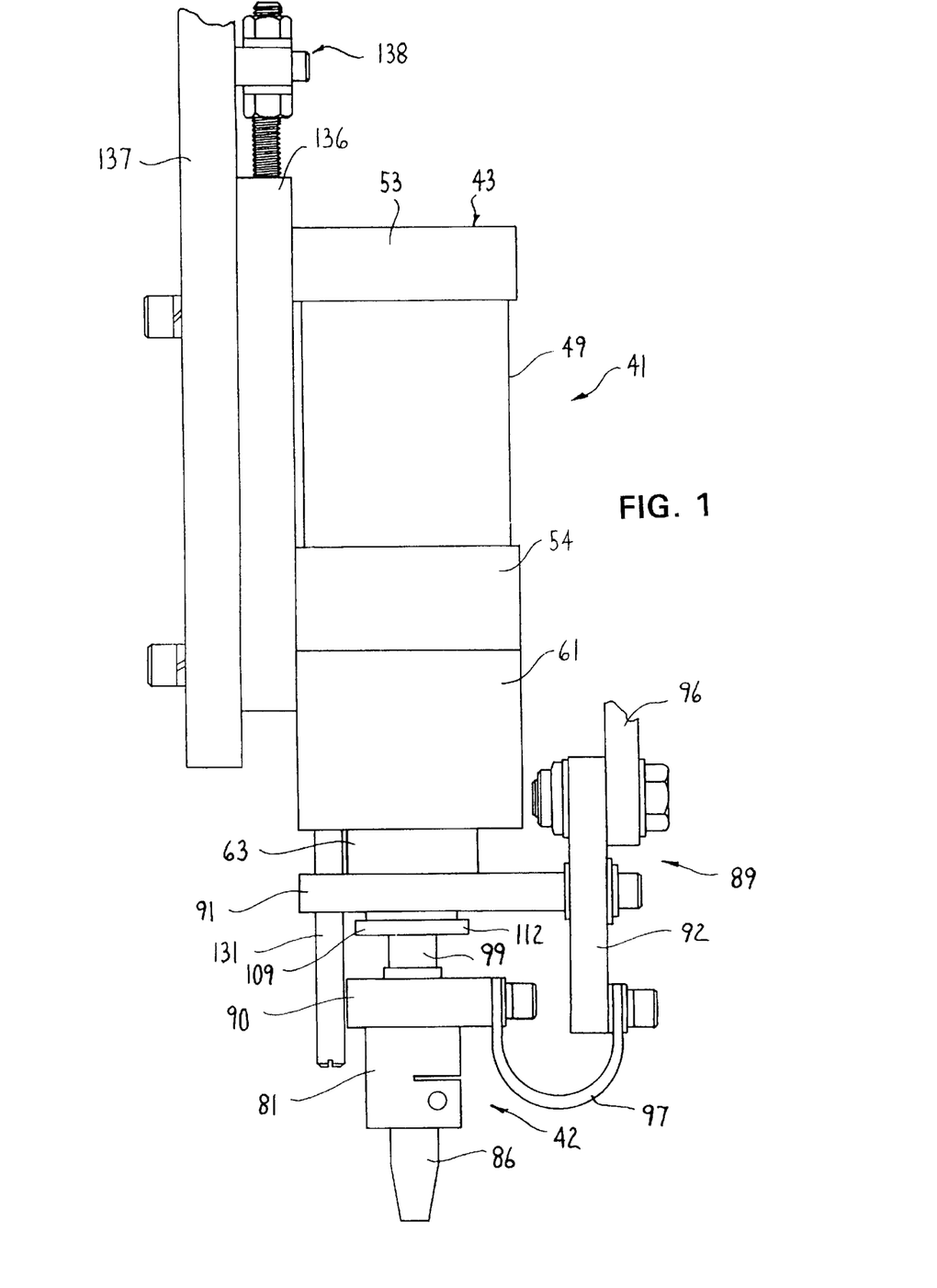
FIG. 1 is an elevational view which illustrates a low inertia projection welding head assembly according to the present invention.
Figure 2:
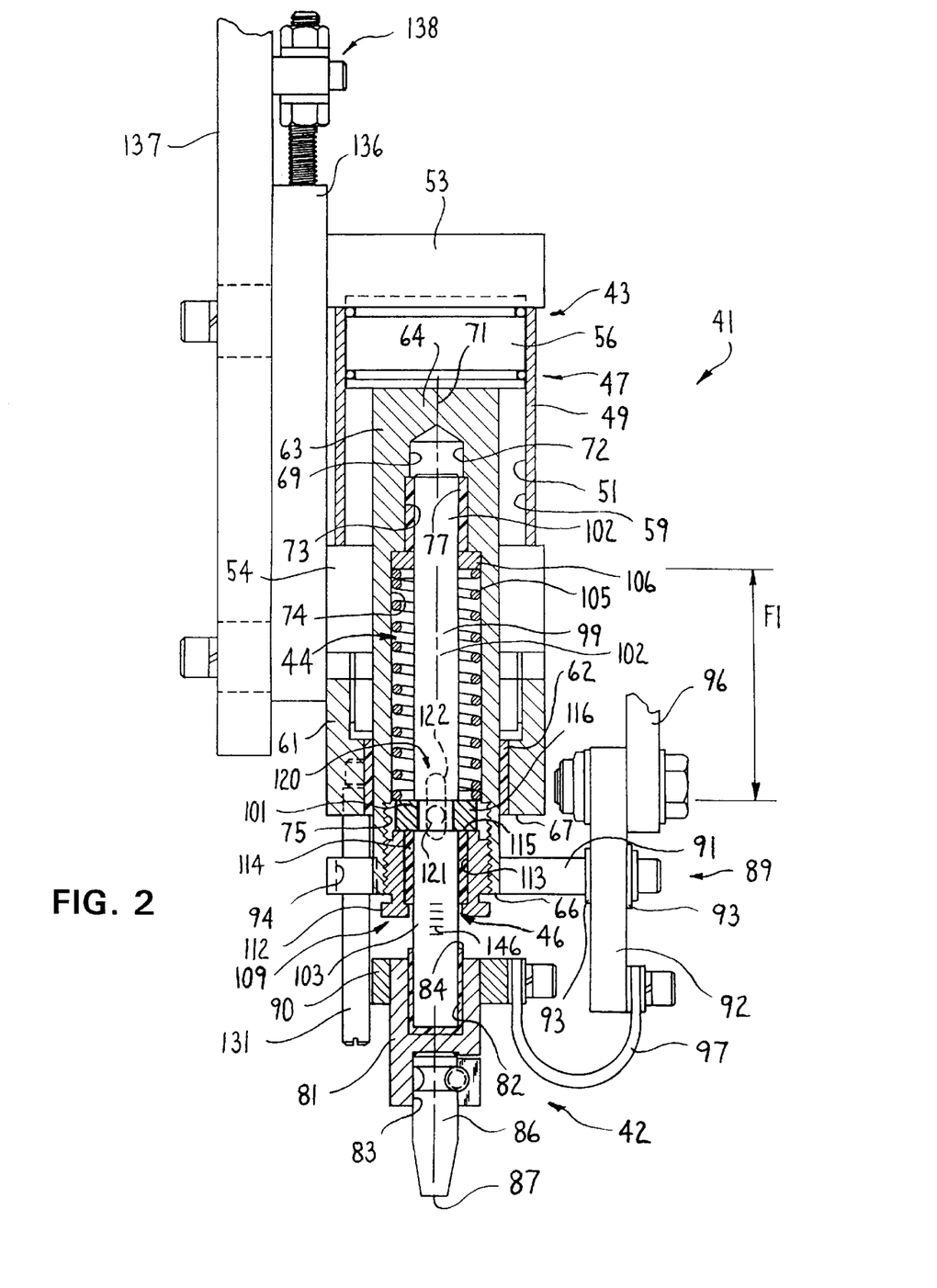
FIG. 2 is a longitudinal cross sectional view of an arrangement of FIG. 1 and showing the electrode in its fully extended position and the rod of the drive cylinder in its retracted position.
Figure 3:
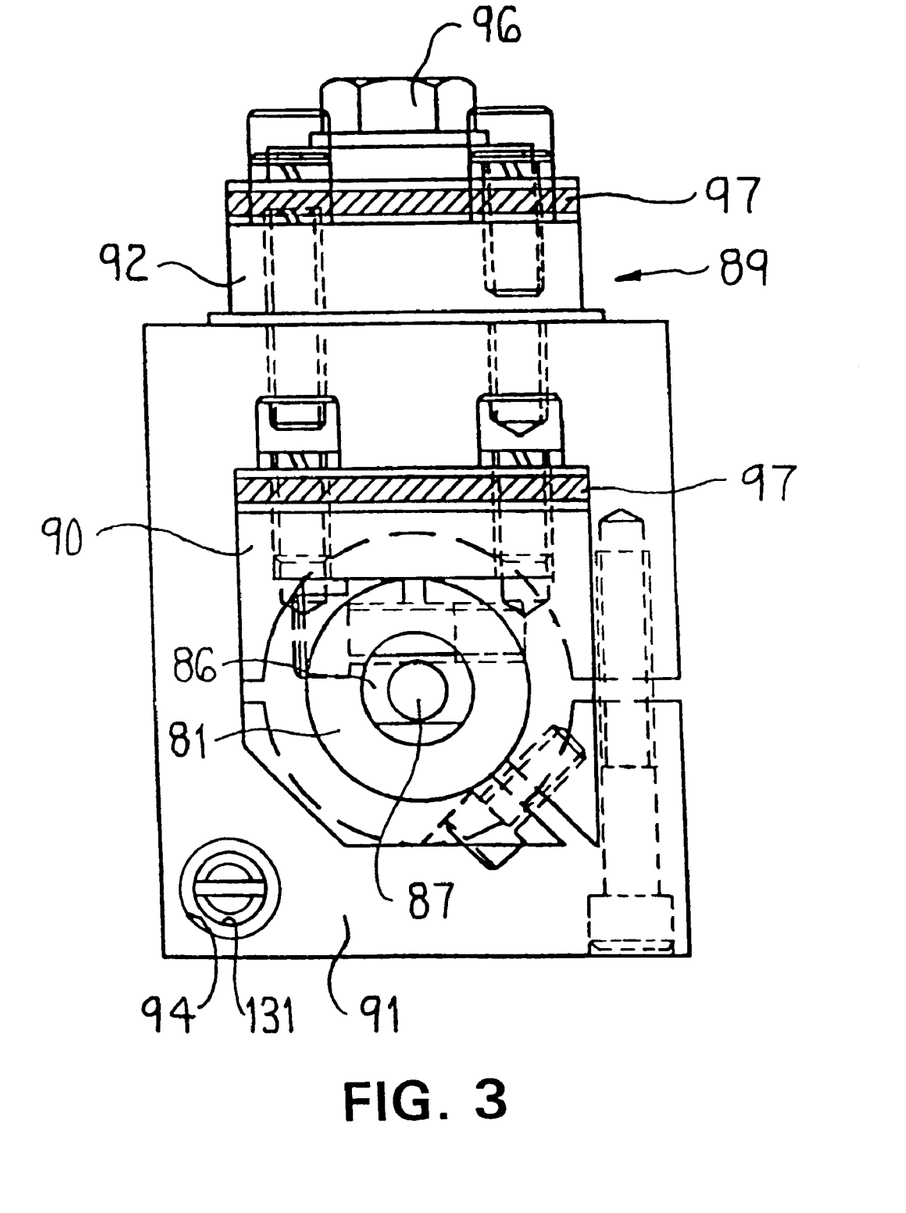
FIG. 3 is a bottom view of the arrangement of FIG. 1.

Referring to FIGS. 1 and 2, there is illustrated a welding head arrangement and more specifically an improved integrated projection welding head and drive assembly 41 according to the present invention. This integrated assembly 41 replaces both the drive device 36 and the head assembly 17 of the prior welding system shown in FIG. 8. The assembly 41, which includes an electrode assembly 42 mounted on a fluid pressure drive cylinder 43, is particularly desirable for creation of a projection weld between overlapping thin metal sheets, such as illustrated in FIG. 8. The assembly 41 is also particularly suitable for application of a very short-duration unipolar current pulse as described in the aforementioned '122 patent and for preloading the electrode spring force as described in the aforementioned '730 patent. The assembly 41 further includes a force generating unit 44 providing an outward biasing force to the electrode assembly 42 and includes an adjusting structure 46 for selecting the force generated by the force generating unit 44.

More specifically, as illustrated in FIGS. 1–6, the drive cylinder 43 has an elongate housing 47 including an elongate cylinder wall 49 surrounding a bore 51. The bore 51 is respectively closed at its upper and lower ends by upper and lower heads 53, 54. As a result, the bore 51 defines a fluid driven chamber in which a piston 56 is reciprocally driven downward and upward effecting movement of the electrode assembly 42.

The piston 56 is slidably received in the bore 51 and fluidly divides said bore into a forward pressure chamber 58 and a return pressure chamber 59. At least two ports (not shown) respectively communicate fluid to the forward and return pressure chambers 58, 59 to effect movement of the piston 56. A bearing housing or carrier 61 is fixed at one end of the drive cylinder 43 adjacent the lower head 54 and has a bearing or cylindrical bushing 62 fixed therein.

An elongate cylindrical piston rod 63 has an upper end 64 thereof coaxially fixedly secured to the piston 56, and extends longitudinally through the return chamber 59, lower head 54, and bearing carrier 61, and is slidably supported in bearing 62. A lower free end 66 of the rod 63, which free end 66 is remote from the piston 56, is disposed longitudinally outwardly beyond a lower end face 67 of the bearing carrier 61. The rod 63 has a hollow interior or blind bore 69 opening coaxially from the rod free end 66 and extending axially along the longitudinal central axis 71 substantially the length of the rod 63 and ending closely adjacent at the fixed rod end 64. The bore 69 has a stepped configuration wherein the first portion 72 of the bore 69 is positioned closest the fixed rod end 64 and has a closed upper end. Second, third and fourth portions 73, 74, 75 of the bore 69 are sequentially arranged from the first bore portion 72 to the free rod end 66. The diameters of the bore portions 72, 73, 74, 75 respectively increase. The second bore portion 73 mounts a cylindrical bearing or bushing 77 therein. The fourth bore portion 75 is internally threaded.

The electrode assembly 42, which is mounted on the drive cylinder 43, includes an electrically conducting adapter block 81 having a generally H-shape cross section and having an upwardly oriented mounting opening 82 coaxial with the central axis 71. An electrically insulative end cap 84 is received in the mounting opening 82 to electrically insulate the electrode assembly 42 from the drive cylinder 43. The adapter block 81 also has a downwardly oriented electrode receiving opening 83 which mounts a conventional rod-like electrode 86 therein. The electrode is clamped by a lower wall of the adapter block 81 that defines a conventional split clamp. The electrode 86 is elongate and has a tapered lower workpiece-contact end or tip 86 that is longitudinally spaced from the adapter block 81. In a preferred embodiment, the electrode receiving opening 83 and mounting opening 82 are axially aligned along the central axis 71.

An electrical power transmitting assembly 89 supplies electrical current to the electrode assembly 42 and includes a split clamp 91 which is clampingly secured to the piston rod 63 adjacent the free end thereof so as to be axially spaced downwardly from the bearing carrier end face 67, whereby the clamp 91 does not interfere with the reciprocating motion of the piston rod. The power transmitting assembly 89 includes a rigid conductive element 92 which is secured to a radially extended portion of the split clamp 91, which element conducts electrical energy therethrough and is radially outwardly spaced from the outer wall of bearing carrier 61. Insulators 93 are positioned between the conductive element 92 and split clamp 91 to prevent the electrical energy from being transmitted to the split clamp 91. Diametrically remote from the conductive element 92, the split clamp 91 has a vertical bore 94 therethrough which is slidably engaged on an elongate guide rod 131 which is fixed to the bearing carrier 61 and is cantilevered downwardly in parallel with the axis 71, which arrangement prevents rotation of the power transmitting assembly. An upper end of the conductive element 92 is secured to one end of a first flexible electrically conductive cable or lamination 96, typically a copper connector, which at its other end is connected to an electrical power supply, for example the transformer 22, control 23 and voltage source shown in FIG. 8. A second flexible electrically conducting cable or lamination 97 has one end thereof fixed to the lower end of the conductive element 92 remote the first lamination 96. The second lamination 97 has the other end thereof secured to the split clamp 90 to transmit electrical energy through the adapter block 81 to the electrode 86.

To connect the electrode assembly 42 to the drive cylinder 43, the electrode assembly includes an elongate central shaft 99 coaxially aligned with the drive cylinder central axis 71, and slidably supported within the blind bore 69 of the piston rod. An inset groove 101 divides the shaft 99 into smooth-walled upper and lower parts 102, 103. The shaft 99 may be drilled hollow from the upper end of upper part 102 and from the lower end of lower part 103, both hollow portions extending toward, and ending closely adjacent, groove 101. The bushing 77 slidably journals the upper shaft part 102 therein. The upper shaft part 102 has a diameter at least slightly less than the diameter of the first bore portion 72 so that it is readily receivable therein. The lower shaft part 103 is partially housed within the fourth bore portion 75 and extends axially outwardly beyond the free rod end 66, whereby the lower end of rod part 103 projects into the insulative cap 84 and has the adapter block fixed thereto by means of the split clamp 90.

Considering now the force generation unit 44, same includes an axially elongate spring 105, preferably a compression-type coil spring, that is entirely housed in the piston rod bore 69, primarily in the third bore portion 74 in the illustrated embodiment. An annular bearing plate or washer 106 abuts the shoulder between the second and third bore portions 73, 74, and supportingly engages an upper end of the spring 105 thereagainst. The lower end of the spring 105 is seated on a split collar 116 which surrounds and is fixed to the shaft 99, as by being seated in the insert groove 101. The spring 105 thus biases the electrode assembly outwardly (i.e., downward) relative to the drive cylinder 43.

The adjusting structure 46 which operates with the force unit 44 includes a stop or end assembly 109 that is positioned at the free rod end 66 and includes a generally cylindrical adjusting member 111 that is externally threaded and is threadedly received in the fourth bore portion 75. The member 111 has a radially outwardly extending drive flange 112 at a lower end thereof. As shown in FIG. 2, the drive flange 112 is spaced axially from the free rod end 66 so that the drive flange is engageable by a suitable tool or manually to rotate the end assembly 109 relative to the fourth bore portion 75 to thereby axially adjust the positioning of the end assembly 109 in the fourth bore portion 74. The member 111 also has a cylindrical opening 113 extending longitudinally therethrough centered about the longitudinal central axis 71. The opening 113 receives a cylindrical bushing 114 fixed therein for slidably supporting the lower shaft part 103.

The upper end of the adjusting member 111 defines thereon an upwardly facing, annular end surface 115 which functions as a stop for abutting engagement with the collar 116 to limit and define the lowermost extended position of the electrode. Further, the selected axial position of the member 111 determines the maximum axial spacing between the stop 115 and the bearing plate 106, and hence determines the magnitude of the initial or preset compression force on the spring 105.

An anti-rotation mechanism 120 cooperates between the piston rod 63 and the shaft 99 and includes a pin 121 which is fixed to the shaft 99 and projects radially therefrom into an elongate slot 122 which is formed in and extends longitudinally of the rod 63. The slot 122 has a width substantially equal to the diameter of pin 121 to prevent relative rotational movement between the central shaft 99 and rod 63. The slot 122 has a height significantly greater than the diameter of the pin 121 for allowing axial movement of the shaft 99 with respect to the rod 63.

As illustrated in FIG. 1, the housing of the drive cylinder 43 is fixedly secured to an attachment plate 136 which in turn is slidably supported on a fixed frame element 137. A conventional adjustable stop mechanism 138 fixedly positions the attachment plate to the frame element and prevents movement therebetween once the assembly is positioned for repeatable welding operations.

The shaft 99 can be provided with indicia 146 which provide a readily viewable structure to determine the relative axial position between the electrode support shaft 99 and the end assembly 109 to hence determine the spring compression. The indicia 146 in the illustrated embodiment includes a plurality of uniformly axially spaced lines 147 which are formed on and extend transversely of the shaft 99. The marks 147 are disposed in the vicinity of the lower end of the adjusting member 111 so as to be visually alignable with the lower surface 148 thereof.

The operation of the integrated welding head and drive cylinder assembly 41 of the present invention will now be described.

It is desirable to precisely control and predetermine the force applied onto a projection weld by the electrode assembly 42 during a projection welding operation. The present invention provides for the precompression of the spring 105, which is entirely housed in the rod 63, so that repeatable and uniform projection welds can be created.

Figure 4:
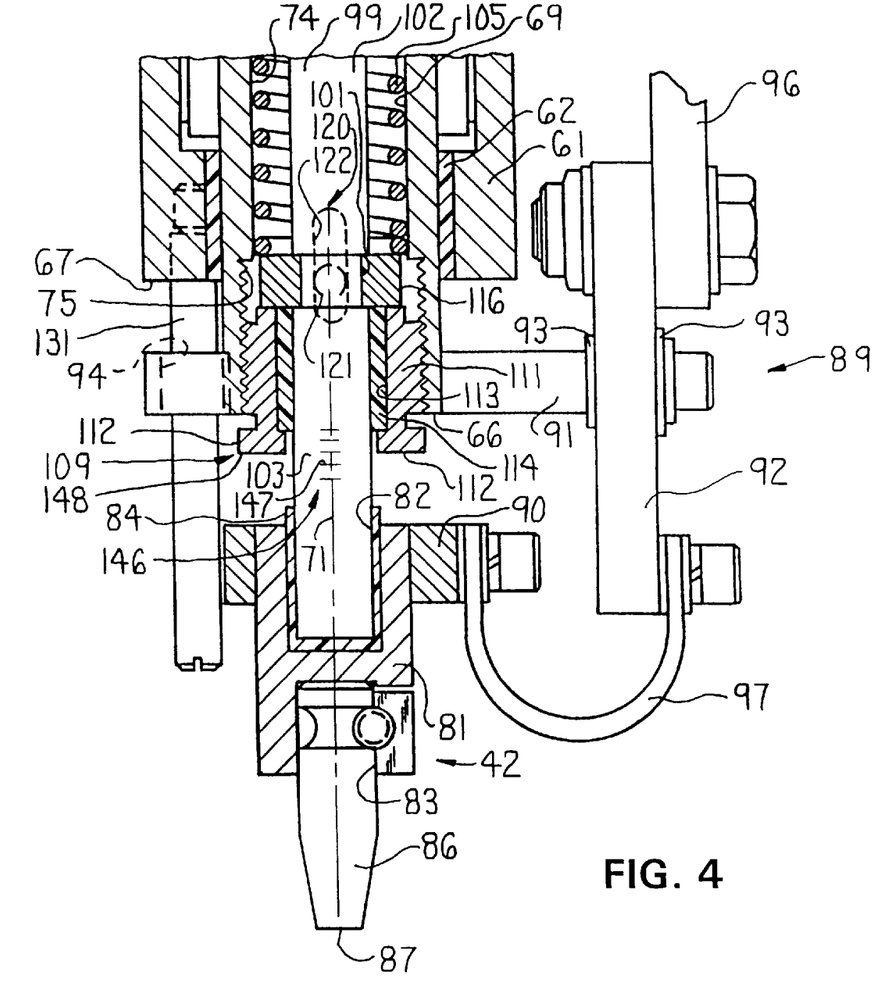
FIG. 4 is an enlarged fragmentary sectional view illustrating the lower portion of FIG. 2.
Figure 5:
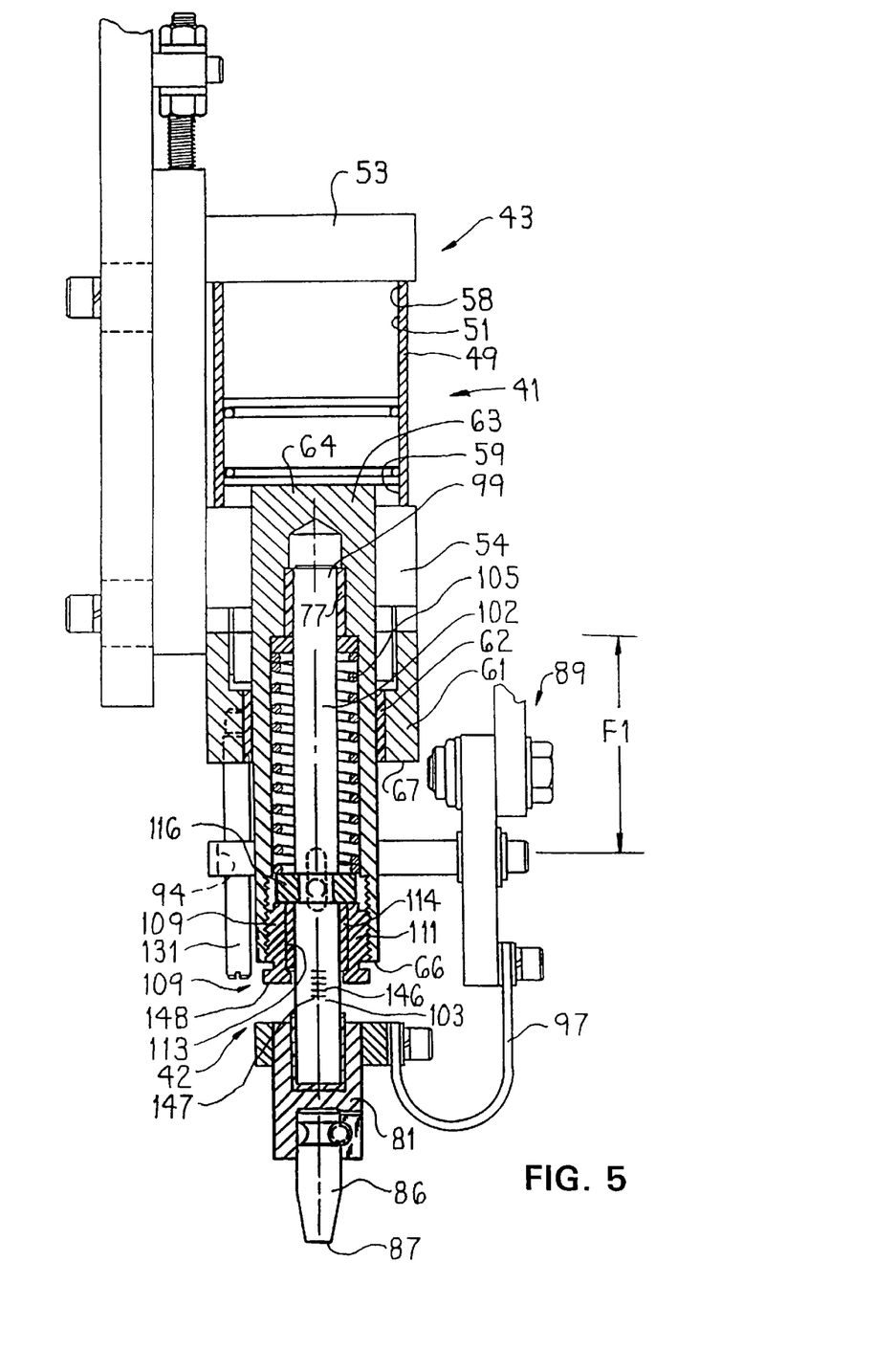
FIG. 5 is a longitudinal cross sectional view similar to FIG. 2 but showing the rod of the drive cylinder in an extended position.
Figure 6:
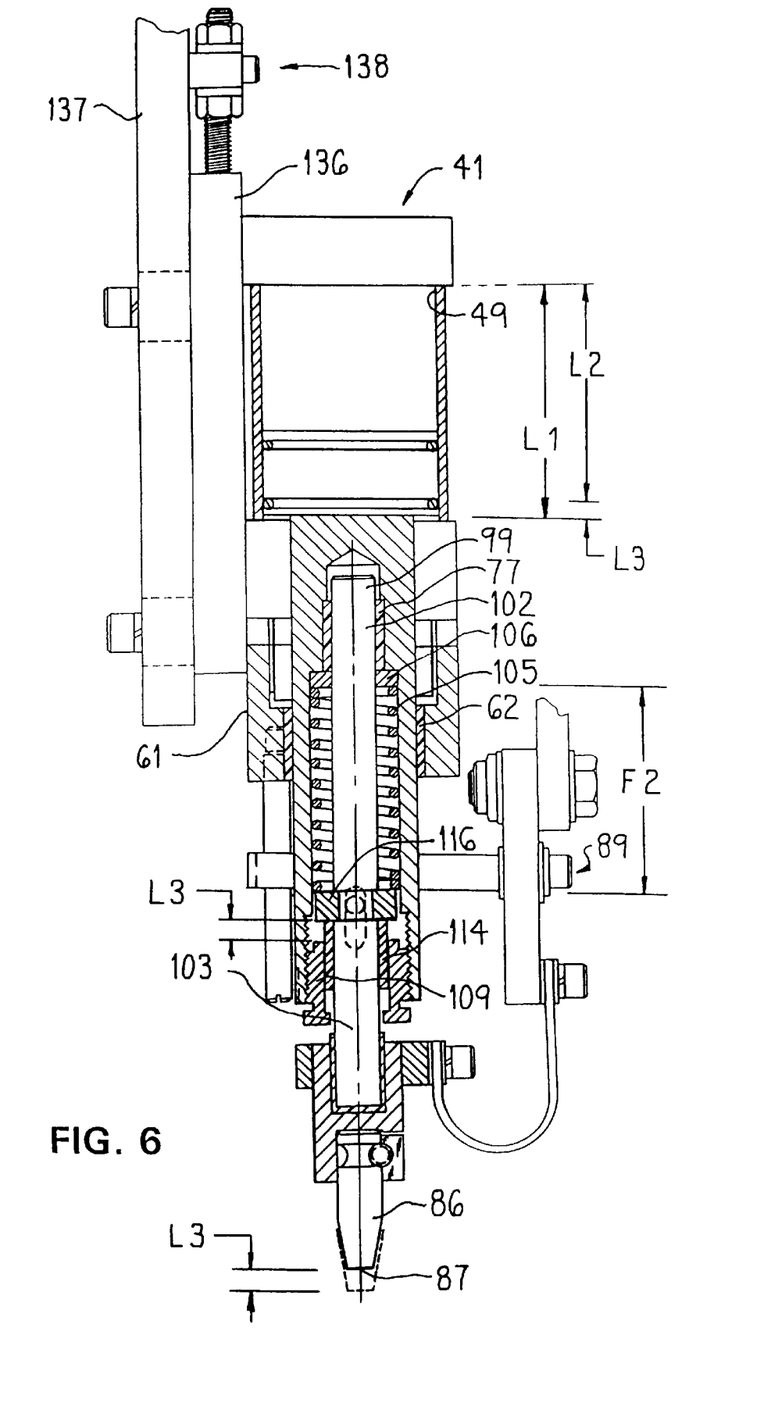
FIG. 6 is a view corresponding to FIG. 5 but illustrating a condition wherein the electrode is depressed by predetermined distance, the rod of the drive cylinder is fully extended, and the spring is precalibrated to create a predetermined force whenever the electrode is depressed through said predetermined distance.

When the electrode assembly 42 is fully assembled and in its fully extended state as shown in FIGS. 2, 4 and 5, the electrode assembly is linearly extended from the rod 63 by its greatest amount. In the electrode assembly's fully extended state, the spring 105 is confined and precompressed between axially spaced support surfaces, namely the bearing plate 106 and collar 116, which collar abuts the stop 115, to create a spring preload force F1.

The preload force F1 maintains the electrode assembly 42 and shaft 99 in their fully extended position until a force is applied oppositely directed to the preload force F1 and overcoming same so as to displace the electrode assembly 42 and shaft 99 upwardly with respect to the rod 63 and axially into the bore 69 against the biasing of the spring 105.

To achieve a welding operation, a welding stroke is performed whereby the piston 56 and rod 63 reciprocatingly move upwardly and downwardly each direction through a distance L1 (FIG. 6), this being the permissible stroke of the piston 56. The rod 63 drives the electrode assembly 42 into contact with a workpiece after the rod 63 travels a distance L2 which is less than the stroke L1. The rod 63 then travels the remaining stroke distance L3 (i.e., L1=L2+L3) while the electrode assembly 42 is spatially fixed due to the electrode contacting the workpiece. The rod bore 69 is thus forced downwardly around the shaft 99 so that the upper shaft part 102 is received in the first bore portion 72, and the stop 115 moves downwardly through distance L3 away from the collar 116, the latter being held stationary as the stop 115 moves downwardly away from the collar, compressing the spring 105 so that the spring produces a second spring force F2 (FIG. 6) at the end of stroke L1. The force F2 biases the electrode assembly axially (i.e. downwardly) toward the workpiece. Due to this further spring compression, the second force F2 is greater than the first spring force F1, for example the first spring force may be about 200 lbs. and the second spring force F2 may be about 260 lbs.

The compression force F2 which is applied through the electrode onto the performed workpiece projection is believed most critical with respect to optimizing the formed projection weld. With the arrangement of the present invention, the weld head assembly can be initially preadjusted to provide a uniform force F2 for application to the projection prior to collapse thereof. This force can be initially preset to optimize the accuracy thereof, and one need not rely on the precompression force F1 inasmuch as some irregularity may occur in the relationship between the forces F1 and F2 due to irregularity and nonlinearity of coiled springs. To permit accurate establishment of the desired projection welding force F2 prior to initiating the welding cycle, the welding head is preset generally as follows. First, with the head assembly in its fully extended position, a reading of the indicator 146 is carried out to determine the extension position of the shaft 99 from the bottom of the adjusting sleeve 111. This thus determines the initial position of the electrode assembly. Thereafter an external force is applied to the electrode assembly to cause the latter to be compressed relatively upwardly into the piston rod until the compression force on the electrode assembly equals the desired force F2 (the external force thus being balanced by the spring force). At this desired position, a further reading of the indicator 146 is made, and the distance thereof from the initial reading is calculated. If this distance is greater than the partial stroke L2 required to position the electrode in contact with the workpiece, then the adjusting sleeve 111 is threaded upwardly into the piston rod until the indicator indicates a displacement distance L2 from the original reading. Conversely, if the initial measured distance is less than the stroke distance L2, then the threaded sleeve 111 is threaded downwardly out of the piston rod until the indicator indicates a measured distance equal to the partial stroke L2. When this desired stroke L2 is achieved, then the external compression force is relieved so that the spring 105 expands to move the collar 111 back into engagement with the stop 115 under a spring force F1, which spring force F1 may vary from head assembly to head assembly due to variations in the springs 105. Thus, the head assembly is now preset so that, whenever the electrode assembly is relatively compressed inwardly through the prestroke distance L2, a predetermined force F2 is now accurately generated by the spring 105 and exists for application to the projection prior to the application of the welding current and the subsequent collapse of the projection.

Figure 7A:
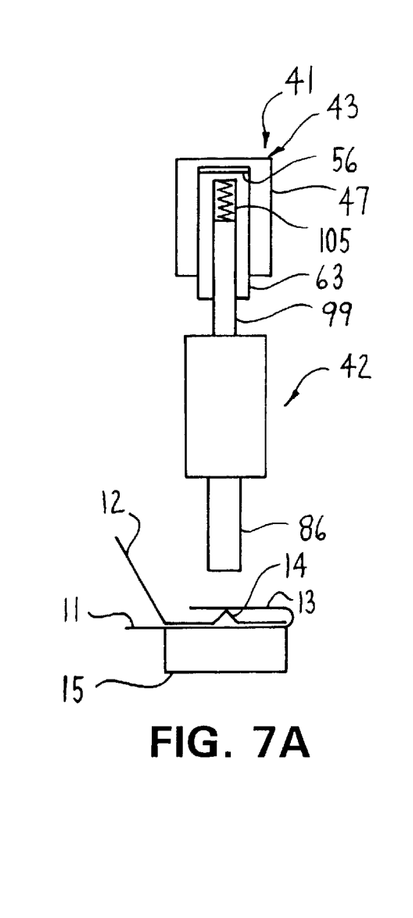
FIGS. 7A, 7B, 7C, and 7D diagrammatically and sequentially illustrate the welding head arrangement of the present invention, and progressively illustrate the positions or relationships associated with the parts thereof during the projection welding process.
Figure 7B:
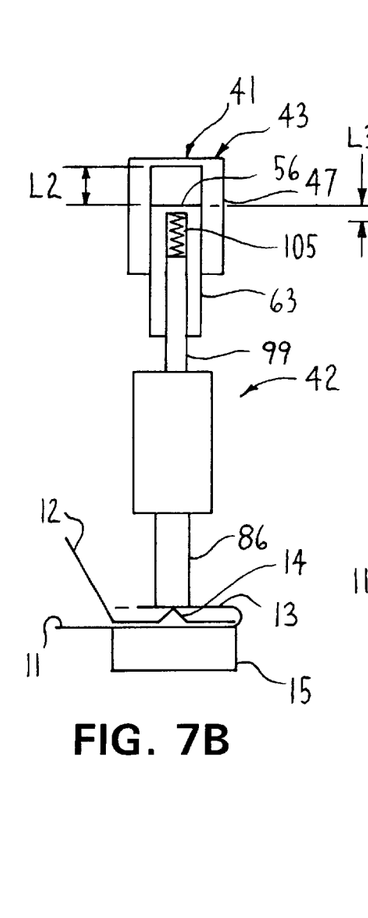
Figure 7C:
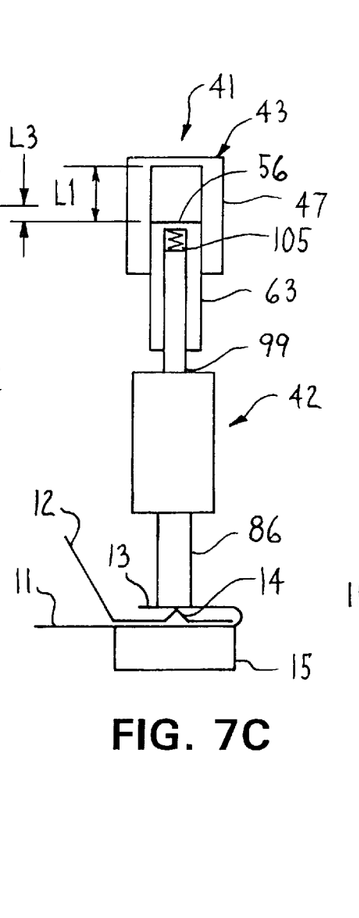
Figure 7D:
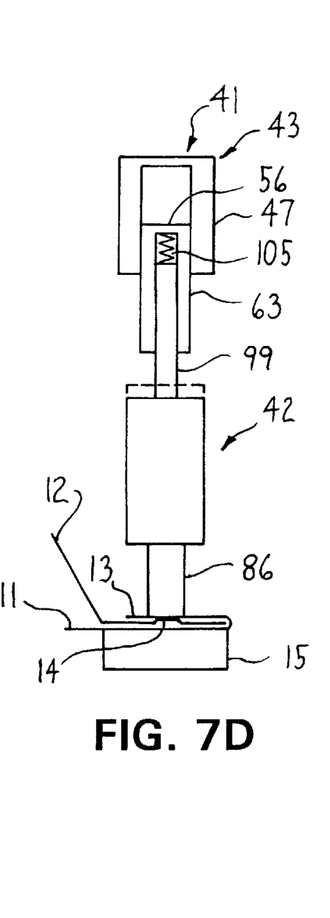

To more fully describe the welding stroke, FIGS. 7A–7D diagrammatically illustrate a projection welding process utilizing the assembly 41 of the present invention. The relative sizes of the parts have been altered to readily distinguish between the parts and aid in describing the welding process. The process begins with the piston 56 and rod 63 at the uppermost position prior to communicating fluid into the forward pressure chamber 58, and the workpieces 11, 12 are supported on a support 15, for example a die (FIG. 7A). In this position the electrode assembly 42 is fully extended and the spring 105 is preloaded to create force F1. The forward pressure chamber 58 receives pressurized fluid to drive the piston 56 and rod 63 downwardly to initiate a welding stroke L1. After partial stroke L2, the tip end of electrode 86 is brought into contact with one of the workpieces 11, here shown as contacting the hem part 13, generally aligned with the projection 14 on the other workpiece 12 (FIG. 7B). The piston 56 and rod 63 thereafter continue to travel downwardly the remaining stroke distance L3, but the electrode 86 is spatially fixed by its contact with the workpiece 11 and therefore the electrode assembly 42 and central shaft 99 do not move. During the stroke L3, the rod 63 moves the plate 106 downwardly and further compresses the spring 105 so that the spring exerts the second force F2 through the collar 116 and electrode assembly 42 onto the projection 14. Electrical energy is then supplied to the electrode 86 to heat the projection 14 to create a projection weld nugget between the two workpieces 11, 12. The spring 105 initially applies the second spring force F2 to the projection 14. As the projection collapses, the spring force is reduced, but the spring force applied to the projection is always at least slightly greater than the preload force F1. The projection 14 collapses to create a weld nugget due to localized heating created by the electrical energy supplied through power transmitting assembly 89 and electrode assembly 42 to the projection 14, and due to the downward force applied thereto by the spring 105. While the projection 14 collapses into the weld nugget, the electrode 86 remains in contact with the one workpiece so as to effect a further pressing together of the workpieces 11, 12. After completion of the collapse of the projection 14, the electrical energy ceases transmission to the electrode assembly 42. The welding assembly 41 returns to the beginning stroke position shown at FIG. 7A by supplying the return pressure chamber 59 with pressurized fluid to drive the piston 56 and rod 63 upwardly to the beginning stroke position.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A projection welding arrangement for creating a projection weld between overlapping first and second workpieces, the first workpiece having a first part overlapping and adjacent a second part of the second workpiece, the second part having a projection therein which projects transversely towards said first part for contact therewith, said arrangement comprising:

a workpiece support for supportive engagement with a side of one of the overlapping first and second parts;

an integrated drive device and projection welding head including a drive cylinder and electrode assembly, the drive cylinder having a piston reciprocatingly driving an elongate rod for moving said electrode assembly between an inoperative extended position and operative retracted position, said electrode assembly being free from contact with workpieces and spaced at its greatest extent from said rod in said inoperative extended position, said electrode assembly being in contact with one of the workpieces for application of electrical energy and compression force to create a weld nugget between the two parts and being retracted toward said rod in said operative retracted position, said rod having a blind bore therein, first and second support surfaces positioned in said bore and spaced at a distance from each other, a spring completely housed in said bore and confined between said first and second support surfaces for urging said electrode assembly outward from said rod toward said extended position, an end member adjustably received in the open end of said bore and accessible outside said rod, said end member being adjustable to position said first support surface relative to said second support surface to initially selectively compress said spring for creating a preload force in said extended position of said electrode assembly, a shaft slidably received in said bore and urged outwardly therefrom by said spring, said end member retaining a first part of said shaft in said bore, said electrode assembly being mounted outside said bore on a second part of said shaft, said shaft moving with said electrode assembly between said extended position and said retracted position; and an electrical power supply means for transmitting electrical power to said electrode assembly to effect a projection weld in conjunction with said spring urged electrode assembly.

2. A projection welding arrangement for creating a projection weld between overlapping first and second workpiece parts, the second part having a projection therein which projects transversely towards said first part for contact therewith, said arrangement comprising:

a workpiece support for supportive engagement with a side of one of the overlapping first and second parts;

an integrated drive device and projection welding head including a drive cylinder and electrode assembly, the drive cylinder having a piston reciprocatingly driving an elongate rod for moving said electrode assembly between an inoperative extended position and operative retracted position, said electrode assembly being free from contact with the workpieces and spaced at its greatest extent from said rod in said inoperative extended position, said electrode assembly being in contact with one of the workpieces for application of electrical energy and compression force to create a weld nugget between the two parts and being retracted toward said rod in said operative retracted position, said rod having a bore therein, first and second support surfaces positioned in said bore and spaced at a distance from each other, a spring completely housed in said bore and confined between said first and second support surfaces for urging said electrode assembly outward from said rod toward said extended position, an end member adjustably received in an open end of said bore, said end member being adjustable to position said first support surface relative to said second support surface to initially selectively compress said spring for creating a preload force in said extended position of said electrode assembly, a shaft slidably received in said bore and urged outwardly therefrom by said spring, said end member retaining a first part of said shaft in said bore, said electrode assembly being mounted outside said bore on a second part of said shaft, said shaft moving with said electrode assembly between said extended position and said retracted position, said rod bore being elongate and blind, said rod bore including sequential stepped bore portions positioned from a closed end of said rod bore to the open end of said rod bore and centered about the longitudinal axis of said rod, a first of said bore portions having a diameter sufficient for receiving said shaft therein in the retracted position, a second of said bore portions having a bushing mounted therein slidably receiving said shaft, a third of said bore portions housing said spring, and a fourth of said bore portions adjustably receiving said end member therein; and an electrical power supply transmitting electrical power to said electrode assembly to effect a projection weld in conjunction with said spring urged electrode assembly.

3. A projection welding arrangement for creating a projection weld between overlapping first and second workpiece parts, the second part having a projection therein which projects transversely towards said first part for contact therewith, said arrangement comprising:

a workpiece support for supportive engagement with a side of one of the overlapping first and second parts;

an integrated drive device and projection welding head including a drive cylinder and electrode assembly, the drive cylinder having a piston reciprocatingly driving an elongate rod for moving said electrode assembly between an inoperative extended position and operative retracted position, said electrode assembly being free from contact with the workpieces and spaced at its greatest extent from said rod in said inoperative extended position, said electrode assembly being in contact with one of the workpieces for application of electrical energy and compression force to create a weld nugget between the two parts and being retracted toward said rod in said operative retracted position, said rod having a bore therein, first and second support surfaces positioned in said bore and spaced at a distance from each other, a spring completely housed in said bore and confined between said first and second support surfaces for urging said electrode assembly outward from said rod toward said extended position, an end member adjustably received in an open end of said bore, said end member being adjustable to position said first support surface relative to said second support surface to initially selectively compress said spring for creating a preload force in said extended position of said electrode assembly, a shaft slidably received in said bore and urged outwardly therefrom by said spring, said end member retaining a first part of said shaft in said bore, said electrode assembly being mounted outside said bore on a second part of said shaft, said shaft moving with said electrode assembly between said extended position and said retracted position, said end member including a central opening therethrough, a bushing fixedly received in said central opening and slidably engaged on said shaft, a collar positioned adjacent an end of said end member, a first axially facing surface of said collar remote from said end member defining said first support surface, a second axially facing surface of said collar adjacent said end member and engageable with said end member at said extended position so that axial adjustment of said end member in said rod bore adjusts the spacing between the first and second support surfaces to adjust the compression of said spring therebetween; and an electrical power supply transmitting electrical power to said electrode assembly to effect a projection weld in conjunction with said spring urged electrode assembly.

4. A projection welding arrangement for creating a projection weld between overlapping first and second workpiece parts, the second part having a projection therein which projects transversely towards said first part for contact therewith, said arrangement comprising:

a workpiece support for supportive engagement with a side of one of the overlapping first and second parts;

an integrated drive device and projection welding head including a drive cylinder and electrode assembly, said drive cylinder including a housing and a piston reciprocating in said housing, said piston driving an elongate rod for moving said electrode assembly between an inoperative extended position and operative retracted position, said electrode assembly being free from contact with workpieces and spaced at its greatest extent from said rod in said inoperative extended position, said electrode assembly being in contact with one of the workpieces for application of electrical energy and compression force to create a weld nugget between the two parts and being retracted toward said rod in said operative retracted position, said rod having a bore therein, first and second support surfaces positioned in said bore and spaced at a distance from each other, a spring completely housed in said bore and confined between said first and second support surfaces for urging said electrode assembly outward from said rod toward said extended position, an end member adjustably received in an open end of said bore, said end member being adjustable to position said first support surface relative to said second support surface to initially selectively compress said spring for creating a preload force in said extended position of said electrode assembly, a shaft slidably received in said bore and urged outwardly therefrom by said spring, said end member retaining a first part of said shaft in said bore, said electrode assembly being mounted outside said bore on a second part of said shaft, said shaft moving with said electrode assembly between said extended position and said retracted position;

an electrical power supply transmitting electrical power to said electrode assembly to effect a projection weld in conjunction with said spring urged electrode assembly, said power supply including a clamp fixed to a free end of said rod outside said drive cylinder housing; and an anti-rotation mechanism preventing relative rotation between said electrical power supply and said rod, said anti-rotation mechanism including a guide element fixed to and extending axially beyond said drive cylinder housing, said clamp extending radially from said rod and having an anti-rotation bore therein that slidably receives said guide element throughout the reciprocating movement of said rod to prevent rotation between said electrical power supply and said rod.

5. A projection welding apparatus for creating a projection weld between two overlying workpieces, one of said workpieces having a projection extending toward and contacting the other workpiece, comprising: an electrode for contacting a workpiece generally in alignment with the projection and applying a predeterminable, repeatable force and electrical energy to effect a projection weld between two workpieces; an elongate rod reciprocatingly moving said electrode from an electrode noncontacting position wherein said electrode is spaced from the workpiece to an electrode contacting position wherein said electrode contacts the workpiece; a drive system reciprocatingly driving said rod; a bore extending in said rod; a shaft slidably received in said bore, said shaft having a first part housed in said bore and a second part extending outwardly from said bore, said electrode being mounted on said second shaft part and being spaced a first distance from an end of said rod in said electrode noncontacting position and also spaced a second distance from the end of said rod in said electrode contacting position; first and second spring support surfaces housed in said bore, said first and second support surfaces being spaced at an adjustable separation distance; an end member axially adjustable received in said bore and including a through opening slidably receiving said shaft, said end member including an interior portion in said bore contacting and positioning said first support surface in said electrode noncontacting position so as to determine said separation distance, and said end member also including an exterior portion freely accessible from outside said rod to be driven to axially adjust said end member in said bore and thereby adjust said separation distance in said electrode noncontacting position by axially positioning said first support surface; and a spring confined between said first and second support surfaces, said separation distance between said first and second support surfaces biasing said spring to create a preload spring force that biases said electrode outwardly away from said rod at said first distance in said electrode noncontacting position, said spring yielding to hold said electrode in said electrode contacting position as said rod continues to be driven after said electrode contacts the workpiece.

6. The apparatus according to claim 5, wherein said second support surface is axially fixed in said bore.

7. The apparatus according to claim 5, wherein said bore is a blind bore, said end member is a fitting threadedly received in the open end of said blind bore, and said through opening extending centrally through said fitting.

8. The apparatus according to claim 5, wherein said second distance is shorter than said first distance.

9. A projection welding apparatus for creating a projection weld between two overlying workpiece parts, one of said workpiece parts having a projection extending toward the other workpiece part, comprising:

an electrode assembly for contacting one of the workpiece parts generally aligned with the projection;

a fluid pressure cylinder reciprocatingly moving the electrode assembly into contact with the one workpiece part, the pressure cylinder including a housing defining a bore, a reciprocating piston in said bore, a rod cantilevered to said piston and projecting outwardly of the housing so as to terminate in a free end, said rod having a blind bore projecting inwardly from the free end thereof and terminating adjacent said piston, said electrode assembly being adjacent said free end;

a force generation unit interconnected to and biasing said electrode assembly outwardly from said pressure cylinder, said force generation unit being completely housed in said bore; and a force adjustment unit received in said bore at said free rod end for adjusting the force generated by the force generation unit.

10. The projection welding apparatus according to claim 9, wherein an elongate shaft is slidably housed in said bore and has a part extending beyond said rod free end, said electrode assembly is fixed to said shaft part, and said force generation unit is interconnected to and biases said shaft outwardly of said bore.

11. The projection welding apparatus according to claim 10, wherein said force generation unit includes a spring confined between a collar and a support surface fixed relative to said rod, said collar being fixed to said shaft and being urged against said force adjustment unit when the electrode assembly is free of contact with said one workpiece part, and after said electrode assembly contacts the one workpiece part continued movement of said rod moving said force adjustment unit away from said collar and moving said fixed support surface toward said collar.

12. The apparatus according to claim 10, wherein said force generation unit includes a spring, and said force adjustment unit includes a sleeve rotatably received in said bore at said rod free end, said sleeve being selectively axially adjusted so as to preadjust the axial position of a collar fixed to said shaft to preadjust an initial force generated by said spring biasing said electrode assembly outwardly from said rod when said electrode assembly is free of contact with said one workpiece.

13. The apparatus according to claim 12, wherein said fluid pressure cylinder includes a pressure chamber between said housing and a back surface of said piston opposite said rod, whereby pressure within said pressure chamber acting on said back surface drives said piston and rod toward the one workpiece part with said spring holding said shaft part and electrode assembly stationary relative to said rod until said electrode assembly contacts the one workpiece part and said pressure within said pressure chamber then continues to drive said piston, rod and support surface toward the one workpiece part so as to compress said spring which biases said electrode assembly against the one workpiece part with a force greater than the force exerted by said spring when said electrode assembly is free of contact with said one workpiece part.

14. The apparatus according to claim 9, wherein said fluid pressure cylinder includes an interior pressure chamber between said housing and a surface of said piston opposite said rod, whereby pressure within said interior pressure chamber acting on said surface drives said piston and rod toward the one workpiece part until said electrode assembly contacts the one workpiece part, whereat pressure within said interior pressure chamber overcomes the biasing of said force generation unit and continues to drive said piston and rod toward the one workpiece part with said electrode assembly being essentially spacially fixed while in contact with the one workpiece part.

15. A projection welding arrangement for creating a projection weld between overlapping first and second workpiece parts, one of the first and second workpiece parts having a projection extending transversely toward the other workpiece part for contact therewith, the arrangement comprising an integrated drive device and projection welding head including a drive mechanism and an electrode assembly, said drive mechanism including:

a pressure cylinder housing having a hollow interior which mounts a slidable piston therein, a drive chamber being defined between said housing and one side of said piston for receiving pressure fluid therein to effect movement of said piston toward the first and second workpiece parts;

an elongate rod cantilevered to an opposite side of said piston remote from said drive chamber and extending coaxially from said piston toward said first and second workpiece parts, and a blind bore formed coaxially within said rod and terminating at an open end defined at a free end of said rod remote said piston;

an elongate shaft coaxially and slidably received in said blind bore and including a shaft section extending axially outside said bore beyond said free end and projecting toward the workpiece parts, said shaft section having said electrode assembly fixedly mounted thereon;

first and second supports in said bore in an axially spaced relation from one another, said first support being fixed relative to said rod adjacent a closed end of said bore, said second support being fixed to said shaft and movable axially within said bore;

a biasing member completely housed in said bore and confined between said first and second supports for urging said shaft axially outwardly of said rod; and an end member adjustably movably mounted in said bore of said rod and cooperatingly engaged with said second support so as to limit axial movement of said second support and shaft toward the workpiece parts and to determine a force created by said biasing member for urging said shaft outwardly of said rod, said end member including an end member portion adjacent said free end of said rod and manually accessible from outside said rod for rotatable movement which adjusts the axial position of said end member in said bore so as to axially limit movement of said second support and shaft toward the workpiece parts at the urging of said biasing member.

16. An arrangement according to claim 15, wherein said drive device includes an attachment mechanism fixed to said housing and axially movably secured to a frame for adjusting the axial position of said drive device relative to the workpiece parts.

17. An arrangement according to claim 15, wherein said end member comprises a sleeve which is threaded into said bore at the free end thereof in concentric and surrounding relation to said shaft, said sleeve having an inner end positioned to abut said second support, and said end member portion being defined at an outer end of said sleeve which projects outwardly from the free end of said bore.

* * * * *